FIG. 1

GUANYLATION OF POLYVINYL ALCOHOL AS SHOWN BY INFRA-RED SPECTRA

GUANYLATION OF CELLULOSE AS SHOWN BY
INFRA-RED SPECTRA

United States Patent Office 3,496,155
Patented Feb. 17, 1970

3,496,155
GUANYLATED POLYHYDROXYLIC POLYMERS AND PROCESS FOR PREPARING SAME UNDER STRONGLY ACIDIC AQUEOUS CONDITIONS
Michael Niall O'Connor, Norwalk, Conn., and David Randal Sexsmith, Kinnelon, N.J., assignors to American Cyanamid Company, Stamford, Conn., a corporation of Maine
Continuation-in-part of application Ser. No. 515,234, Dec. 20, 1965. This application Oct. 3, 1968, Ser. No. 764,906
Int. Cl. C08f 27/08; C08b 19/04, 15/06
U.S. Cl. 260—91.3
10 Claims

ABSTRACT OF THE DISCLOSURE

Guanylated polyhydroxylic polymers having enhanced degrees of nitrogen substitution, such as guanylated polyvinyl alcohol or cellophane, are prepared by contacting unguanylated polymer with an aqueous hydrohalogen acid (HCl or HBr) solution of cyanamide at temperatures of 40° C. to 100° C., said solution containing from about 0.5 to about 4 moles of cyanamide per mole of hydrohalogen acid and having a cyanamide concentration of at least about 0.4 molal and a solvent content not below about 30%, pH of said solution being below 1.0.

CROSS REFERENCE TO RELATED APPLICATIONS

This is a continuation-in-part application of application Ser. No. 515,234, filed Dec. 20, 1965, now abandoned, on behalf of the present inventors under the title: Cationic Natural and Synthetic Polymeric Products and Process for Preparation Under Strongly Acidic Conditions.

BACKGROUND OF THE INVENTION

It is established that polyhydroxylic polymeric materials such as starch and cellulose can be partially guanylated by reaction with aqueous alkaline solutions of cyanamide in accordance with the following equations (wherein R represents polymeric backbone):

(1)

(2)

Once guanylated polymer (B) is prepared, it is readily converted into the often more desirable cationic acid salt by treatment with any of a variety of acids in accordance with the following equation:

(3)

Examples of alkaline guanylation using aqueous cyanamide solutions are readily available in U.S. Patents 3,051,698 (guanylation of cellulose products), 3,051,699 (guanylation of granular starch products), and 3,051,700 (guanylation of starches containing at least 50% amylose). In all of these patents, the existence of alkaline conditions is stated to be essential for effective guanylation, with a pH of from about 10–12.5 being generally preferred.

It had been thought that guanylation of polyhydroxylic polymers would not occur under acidic conditions since hydroxyl groups of the polymer only ionize in the presence of base as shown in Equation 1 above to produce the reactive polymeric anion (A). Acidic conditions would, of course, not produce reactive anion (A). However, two references are available which teach guanylation under acidic conditions.

U.S. Patent 2,530,261 teaches nitrogenation of cellulose and protein textile materials by treatment with an aqueous acidic cyanamide solution wherein the acid is a non-volatile mineral acid. It is now known that such products, despite the presence of some nitrogen therein, are essentially anionic since the predominate reaction is one of the acid with the polymeric hydroxyl groups to produce anionic ester groupings on the polymer.

U.S. Patent 3,051,691 teaches guanylation of polymeric polyol hydrophillic colloids with aqueous acidic cyanamide solutions having a pH of at least 1. This patent lists examples of guanylation under acidic conditions which show appreciable amounts of nitrogen in the guanylated product. This is most surprising since polyhydroxylic polymers would not be expected to be sufficiently reactive under acid conditions to react with cyanamide since, as discussed heretofore, there should be no appreciable formation of the reactive polymeric anion (A) unless alkaline conditions exist. Although the patent cites examples of nitrogen substitution under acidic reaction conditions, the patent clearly teaches that alkaline reaction conditions are highly preferred since in virtually all cases where degree of nitrogen substitution is presented as a function of pH, nitrogen substitution is greatest under alkaline conditions and noticeably diminishes as pH values become more acidic. Thus, the teaching is away from more acidic reaction conditions and, in fact, the patentee specifically excludes a pH range of below 1.0. This is not surprising since at such extremely low pH values, extremely rapid hydrolysis of cyanamide to urea would be predicted with a subsequent rapid loss of reactant cyanamide.

In view of the highly unexpected teaching of U.S. Patent 3,051,691 regarding guanylation under acidic conditions (i.e. pH 1 to 7), and since no plausible theory is available to explain why guanylation would proceed under such acidic conditions, applicants have attempted to reproduce the results achieved by the patentees being guided by patentees' disclosure. Results of these experiments are given in Comparative Examples 1 and 2 herein below wherein gunylation was studied using non-alkaline conditions of pH 7.0 and 1.1 respectively. In both cases, applicants were unable to detect any appreciable guanylation when compared to unguanylated control samples. This conclusion was based on Kjeldahl nitrogen analyses and infra-red analyses for the presence of a pseudourea acid salt structure in the treated product. Such dual analysis, if positive, conclusively establishes the presence of chemically bound pseudourea acid salt on the polymeric substrate thereby indicating effective guanylation. Kjeldahl analyses, on the other hand, while a useful tool, do not necessarily indicate that the nitrogen detected is chemically bound to the substrate. Kjeldahl analyses, for example, would detect unbound nitrogen in a sample which could originate from unreacted cyanamide which was not completely removed from the sample.

In Comparative Examples 1 and 2, various reaction temperatures were tried in the hope that higher temperatures might produce guanylation in accordance with patentees' disclosure. As can be seen from the data, in no case was appreciable guanylation achieved even at temperatures as high as 80° C.

It must also be noted that the prior art has taught on more than one occasion that attempted guanylation of polyhydroxylic polymers with aqueous acidic cyanamide solutions produces no appreciable nitrogenation of the polymer. For example, in U.S. Patent 3,051,699, the patentees present data which indicate no appreciable guanylation of corn starch at pH values below 8.5 and specifically state that no appreciable reaction will occur until a pH of 8.5 or more is reached. Similarly, in U.S. Patent 3,051,698, patentees offer numerous examples of the guanylation of substances such as cotton, muslin, sulfite pulp, aged alkali treated sulfite pulp, and such, using aqueous cyanamide solutions under various acidic and alkaline pH values. The nitrogen analysis data provided unequivocally indicate substantially no guanylation of the various polymeric substrates with cyanamide under acidic or neutral conditions, although appreciable guanylation does occur under alkaline conditions.

It thus becomes apparent that while there can be no question that polyhydroxylic polymers can be effectively guanylated under alkaline conditions, the prior art has not adequately defined the preparation of cationic guanylated polyhydroxylic polymers by treatment of the polymer with aqueous acidic cyanamide solution. Applicants have now discovered that guanylated products can be unexpectedly produced by reaction of polyhydroxylic polymers with cyanamide under a narrow range of process conditions which give rise to an extremely acidic reaction medium, namely pH values of below 1. Moreover, applicants have also discovered that guanylated products prepared in accordance with the process of this invention contain substantially greater amounts of nitrogen than guanylated products prepared under the preferred alkaline conditions of the prior art.

SUMMARY OF THE INVENTION

This invention relates to a process for guanylating polyhydroxylic polymers employing aqueous cyanamide solutions under conditions of extreme acidity. This invention further relates to guanylated products which can be prepared in accordance with the process of this invention.

More particularly, applicants have discovered that when polyhydroxylic polymers are contacted with an aqueous hydrochloric or hydrobromic acid solution of cyanamide wherein (1) the mole ratio of cyanamide to acid, and (2) the concentration of cyanamide are controlled to thereby produce a reaction mixture pH of less than 1.0, that products guanylated to an extent not previously available may be prepared. Such products are readily prepared when said aqueous acidic cyanamide solution contains a cyanamide to acid mole ratio of from about 0.5 to about 4.0 and wherein the concentration of cyanamide in the solution is at least about 0.4 molal and the solvent content of the solution is not less than about 30% by weight.

When the conditions prescribed above exist in the aqueous cyanamide solution, the solution pH will always be less than 1.0 and can fall to zero or below.

Under such stringent acidic conditions, it would ordinarily be expected that no guanylation would occur and that instead extremely rapid hydrolysis of cyanamide to urea would occur, leading one to conclude that such conditions would represent an unsuitable route towards guanylated products. Applicants have discovered that not only can guanylated products be prepared under these conditions but also that the products thus prepared contain substantially higher degrees of guanylation than previously obtainable using the preferred alkaline conditions of the prior art. For example, guanylated polyvinyl alcohol has been prepared by the inventive process which contains almost 700% more bound nitrogen than the best prior art guanylated polyvinyl alcohol (see Comparative Example 4 hereinbelow). Similarly, guanylated cellulose has been prepared by the inventive process containing from 300% to 700% more nitrogen than the prior art products (see Comparative Example 5 hereinbelow). Such enhanced nitrogen substitution is, of course, most desirable since it substantially improves the cationic character of the substrate thereby creating a stronger affinity of the substrate for various anionic additives, coatings, dyes, and such. Guanylated polyvinyl alcohol imparts improved wet strength to paper and other cellulosic materials when applied thereto.

DEFINITIONS

The term "cyanamide" as used in the specification means the compound represented by the formula:

$$NH_2C \equiv N$$

The term also includes the $NH_2C \equiv N$ portion of compounds formed when $NH_2C \equiv N$ is placed in a highly acidic aqueous medium such as, for example, the protonated form of cyanamide ($NH_2C \equiv NH^{\oplus}$), cyanamide dihydrochloride, and cyanamide dihydrobromide. The term further includes the $NH_2C \equiv N$ portion of anhydrous sources of cyanamide such as cyanamide dihydrochloride.

The term "cyanamide compound" means "cyanamide" as defined above and other compounds, such as the alkali metal and alkaline earth metal salts of cyanamide, which are capable of generating "cyanamide" in an aqueous solution when sufficient acid is present in the solution to liberate "cyanamide" from the "cyanamide compound."

The term "hydrohalogen acid" means hydrochloric acid or hydrobromic acid only.

The term "cyanamide dihydrohalide" means cyanamide dihydrochloride or cyanamide dihydrobromide only.

The term "molal" means the concentration of cyanamide in the aqueous acidic cyanamide solution expressed as gram-moles of cyanamide per 1000 grams of solution.

The term "solution" means a solution containing at the very least cyanamide, water, and hydrohalogen acid. The term "solution" may also include, in addition to the aforementioned essential three ingredients, one or more inert miscible liquid diluents which it may be desirable to add to the reaction mixture. It should be noted that the term "solution" excludes the polyhydroxylic polymer substrate in all cases, even when the substrate is completely soluble in the solution. In view of this definition of "solution," any computations of the molality of the acidic aqueous solution of cyanamide will exclude from consideration the amount of polyhydroxylic polymer present.

The term "solvent" means water and one or more inert miscible liquid diluents which may, optionally, be present in the solution.

CHEMISTRY OF THIS INVENTION CONTRASTED WITH PRIOR ART CHEMISTRY

The surprising guanylation occurring at pH values below 1.0 results from the preferred formation under these conditions of an activated form of cyanamide, namely cyanamide dihydrochloride or cyanamide dihydrobromide depending, of course, on the acid selected to acidify the solution. Under the acidic conditions of the prior art (U.S. Patent 3,051,691), namely pH 1.0 to 7, the predominate reaction of cyanamide in the presence of water and acid is the hydrolysis of cyanamide to urea with substantially no formation of the cyanamide dihydrohalide species which is a necessary intermediate if guanylation is to be achieved. However, when the ratio of cyanamide to hydrohalogen acid and the concentration of cyanamide in the solution are maintained in accordance with the limits discussed above, the formation of cyanamide dihydrohalide is favored over the hydrolysis to urea. As a result, when the process of this invention is employed, substantial amounts of cyanamide dihydrohalide are formed which are then available to guanylate the substrate. The differences in the chemical reactions which occur at acidic pH values above 1 (the prior art) and below 1 (this invention) are shown in the following chemical equations (wherein R is a polymeric backbone). The equations are written using hydrochloric acid, the preferred hydrohalogen acid. However, the chloride ions in the equations can, of course, be replaced with bromide ions.

Referring to the above equations, it becomes apparent why substantial guanylation is achieved under the extremely acidic process of this invention as compared to virtually no guanylation under the less acidic conditions of the prior art.

In reference to the above equations, it should be noted that the reactive species, cyanamide dihydrochloride (or cyanamide dihydrobromide) exhibit unique and singular behavior as guanylating agents since guanylation will not occur if acids other than hydrochloric or hydrobromic are used. Thus it is the dihydrochloride (or dihydrobromide) salt of cyanamide, and not merely any acid salt, which is essential if effective guanylation is desired. The uniqueness of hydrochloric and hydrobromic acids as vehicles for producing acidic pH conditions in the reaction medium is, of course, in no way appreciated or contemplated by the prior art (U.S. Patent 3,051,691) since the implication therefrom is clearly that any acid would be suitable.

Figure 1:
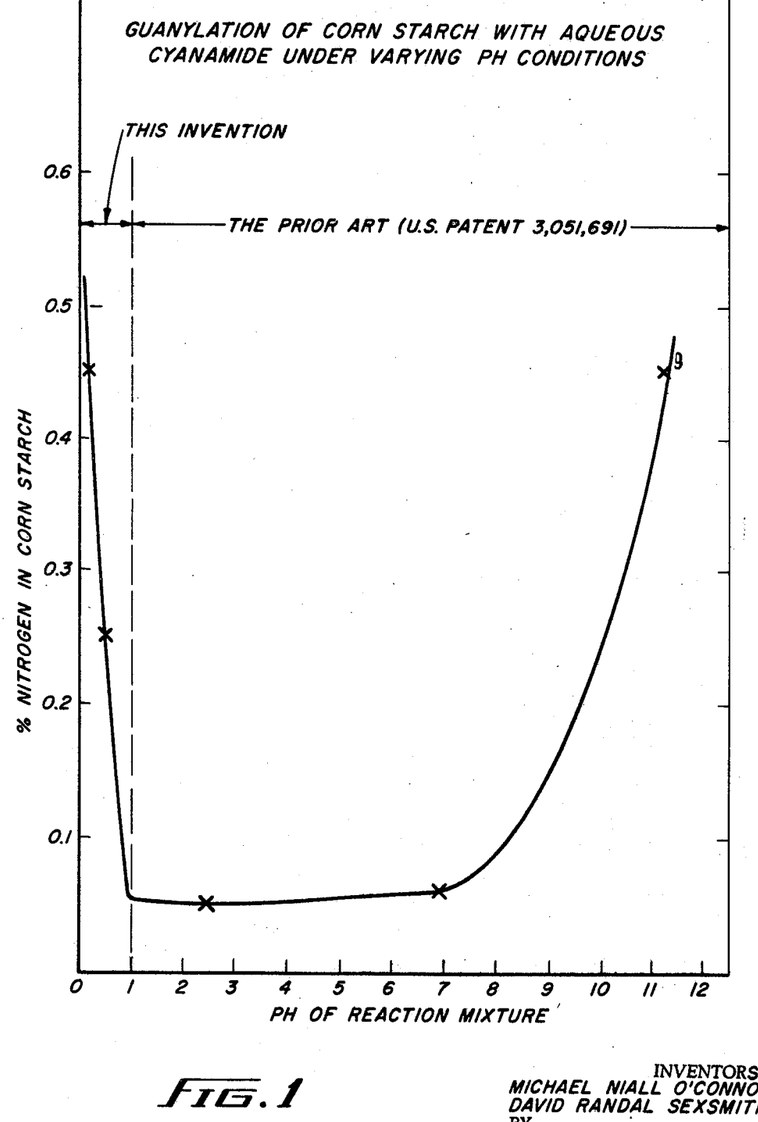
FIGURE 1 is a plot of the degree of guanylation achieved in corn starch (measured as percent nitrogen) as a function of the pH of the reaction medium and serves to clearly indicate the unexpected guanylation achieved under the acidic conditions of this invention, i.e. pH<1, as compared to the acidic and alkaline conditions of the prior art.

The unusual degree of guanylation achieved under the process conditions of this invention is dramatically illustrated in FIGURE 1 wherein the degree of guanylation of corn starch achieved under a wide range of reaction pH conditions (as indicated by nitrogen analysis of the treated starch) is plotted as a function of reaction pH. These data clearly indicate that under the acidic conditions of the prior art (pH 1.0 to 7) there is no appreciable guanylation of the starch. However, as soon as the pH is lowered below 1.0 in accordance with the teaching of applicants, there is a remarkable increase in the degree of guanylation achieved, with the curve rising very sharply as pH values drop below 1.

DESCRIPTION OF THE PREFERRED EMBODIMENTS (1) Suitable substrates

A host of polyhydroxylic polymers can be guanylated in accordance with the process of this invention. Among such polymers are included Starch and starch derivatives such as corn starch in either a granular or gelatinized form, hydroxymethyl starch, hydroxyethyl starch, amylose, and amylopectin starches, Dextrins and pectins, Polysaccharide gums, i.e. the mucilages such as agar, algin, tragacanth, arabic, locust bean, guar, cedar, Indian satinwood, cherry, sassa, karaya, carageenin, angico, mesquite, sterculia, and the like, Cellulose in either a natural or regenerated state such as raw or virgin wood (i.e. undigested), wood pulp ranging from raw wood pulp to the purest and most up-graded form of such pulp such as, for example, sulfite pulp, sulfate pulp, kraft pulp and such, α-cellulose, cotton, linen, muslin, paper, paper furnish, rayon, cellophane and other fibrous carbohydrates such as jute and hemp, Cellulose derivatives such as methyl cellulose, cyanoethyl cellulose, hydroxypropyl cellulose, and the like, Hemicelluloses such as xylan, araban, mannan, galactan, and the like, Polyvinyl alcohol, particularly polyvinyl alcohol resins having viscosities at 20° C. in 4% aqueous solutions ranging from about 4 to 65 centipoises, Lignin either as it occurs naturally in undigested or virgin wood, or as it typically occurs after its removal from said wood in typical dilignification processes. In the latter case, the lignin may typically exist as the crude sodium salt of an alkali lignin.

This invention also includes treatment of mixtures of two or more of the foregoing materials.

The foregoing materials can be substantially of any type or source. Thus, starch may be corn starch, potato starch, wheat starch, tapioca and the like, including moderately hydrolyzed forms having reduced viscosity. Gelatinized starches, i.e. starches swelled to a viscous solution or paste, may be employed although such pretreatment is unnecessary. When gelatinized starches are utilized, however, little or no additional water will be added to the reaction mixture, directly or via a concentrated acid, since the substrate will contain sufficient water for effective reaction and guanylation.

The polyhydroxylic polymers can be treated in any desired physical form such as a fiber, pulp, granule slurry, woven cloth, sheets, or plastic films.

(2) Reaction conditions

*Operable conditions.*—Polyhydroxylic polymers are conveniently guanylated in accordance with the process of this invention by contacting the polymer with an aqueous hydrohalogen acid solution containing a mole ratio of cyanamide to acid of from about 0.5 to about 4 and a cyanamide concentration of from at least about 0.4 molal, said solution containing not less than about 30% solvent.

Cyanamide to acid mole ratios below about 0.5 are undesirable because of the possibility of free acid, i.e. hydrohalogen acid not tied up as cyanamide dihydrohalide, existing during the heating period; this free acid could char or otherwise damage the polyhydroxylic substrate. On the other hand, it is desirable to provide some excess cyanamide relative to the acid above and beyond that stoichiometrically required to furnish cyanamide dihydrohalide. The presence of such excess cyanamide compensates for any hydrolysis of cyanamide which does occur thereby helping to tie up the hydrohalogen acid as cyanamide dihydrohalide, the active reactant species, so that more of the acid is made available for reaction.

Cyanamide to acid ratios above 4 are undesirable since ordinarily such higher ratios would burden the process with unduly large amounts of cyanamide which cannot guanylate the substrate due to the presence of insufficient acid to convert it into the reactive cyanamide dihydrohalide.

When cyanamide concentrations below 0.4 molal are used, due to the large amount of water present relative to the cyanamide, the cyanamide will react predominantly with the water to form urea instead of with the hydrohalogen acid to form the desired cyanamide dihydrohalide. As a result, when the cyanamide concentration drops below 0.4 molal, little, if any, guanylation will occur due to the dearth of cyanamide dihydrohalide in solution.

The upper limit of cyanamide concentration which is operable is fixed from a practical point of view and is most conveniently defined in terms of a minimum percent of water which is acceptable in the solution. The solution must contain some water and further it must contain sufficient water to maintain the cyanamide in solution without crystallization or formation of a paste. If crystallization, paste formation, or such occur, it becomes extremely difficult to impregnate substrates which are not dispersible in water (as will be discussed hereinbelow) with the aqueous hydrohalogen acid solution of cyanamide. Generally, to avoid such problems, the solution should not contain less than about 30% solvent. A solution containing 30% solvent will vary in cyanamide concentration depending on the particular ratio of cyanamide to acid existing in the solution.

Figure 2:
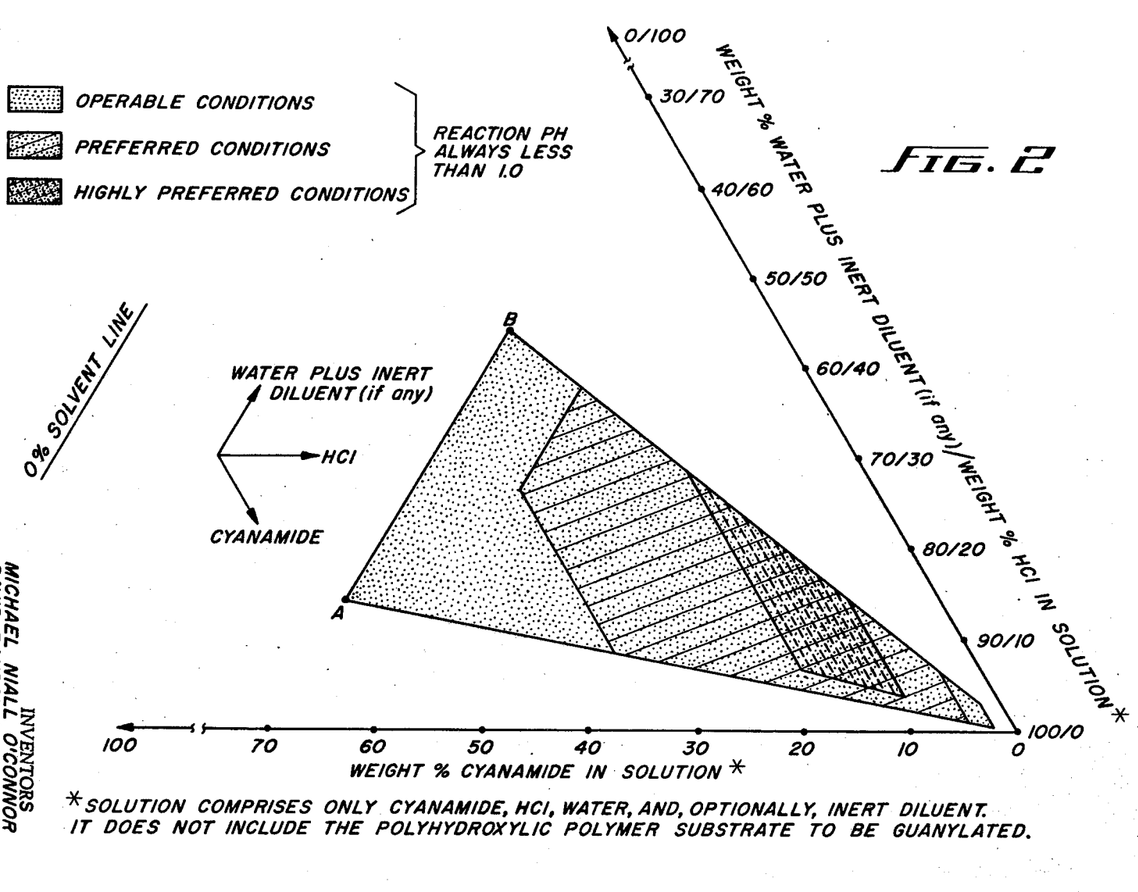
FIGURE 2 is a three component composition diagram representing all possible compositions of a cyanamide-water plus inert diluent-hydrochloric acid solution, which in accordance with the process of this invention produces effective guanylation, with the operable, preferred, and highly preferred process conditions of this invention indicated thereon.

The dotted area of FIGURE 2 depicts a range of operable solution concentrations which will insure that the above requirements of cyanamide to acid ratio, cyanamide molality, and percent solvent are fulfilled. Any solution having a composition falling within the dotter area of FIGURE 2 would be suitable. Although FIGURE 2 applies only when hydrochloric acid is used, a similar graph can be readily prepared for hydrobromic acid.

Referring to FIGURE 2, it will be noted that the line AB defines a locus of compositions containing the minimum acceptable solvent level of 30%. The cyanamide concentration of these compositions can vary anywhere from about 55% at point A to about 25% at point B corresponding to cyanamide concentrations of about 16 molal and 6 molal respectively. This variation in molality is, of course, due to variations which occur in the ratio of cyanamide to acid existing in the solutions represented by line AB.

*Preferred conditions.*—Preferably, the aqueous hydrohalogen acid solutions will contain cyanamide to acid mole ratios of about 0.5 to about 2, a cyanamide concentration of from about 0.9 to about 8 molal and a solvent concentration not less than about 40%.

The cross hatched area of FIGURE 2 depicts a range of solution concentrations corresponding to these preferred solution conditions.

An upper limit of 2 moles of cyanamide to acid is preferred since it ordinarily insures the presence of sufficient cyanamide in solution to tie up any free acid as the reactive cyanamide dihydrohalide. A lower cyanamide concentration of at least 0.9 molal is preferred to minimize the tendancy of cyanamide to hydrolyze to urea. An upper cyanamide concentration of 8 molal is preferred from a practical viewpoint since cyanamide is not commercially available in anhydrous form or in aqueous solutions greater than approximately 50% concentration. As a result, cyanamide solutions below about 10 molal will ordinarily be used. After the required amount of acid (usually added as an aqueous solution) is added, the cyanamide molality will be 8 or less. The presence of at least 40% solvent in the solution will comfortably prevent undesirable cyanamide crystallization or paste formation as heretofore discussed.

*Highly preferred conditions.*—It is highly preferred that the aqueous hydrohalogen acid solution of cyanamide have a cyanamide to acid mole ratio of about 0.5 to about 2, and a cyanamide concentration of from about 2 to about 4 molal, said limits corresponding to solvent concentrations of not less than about 53%. Operation at these cyanamide concentrations is preferred since the use of higher cyanamide concentrations commonly will correspond to undesirably high equivalent ratios of cyanamide to substrate hydroxyl groups when the illustrative procedures of this invention are employed.

The doubly cross-hatched area of FIGURE 2 depicts a range of solution compositions corresponding to these highly preferred solution conditions.

Sufficient acid and cyanamide must be present in the solution to meet the required cyanamide to acid ratio and cyanamide concentration. These conditions may be established either by direct addition of the proper ingredients to the solution, or by the formation of the proper ingredients in situ in the solution. For example, a hydrohalogen acid salt of cyanamide, such as cyanamide dihydrochloride may be dissolved in water, with additional cyanamide, acid, or water being added as desired to adjust the solution to the proper conditions. Alternatively, cyanamide and a hydrohalogen acid can both be added to water in the proper amounts.

The cyanamide can be produced in situ by adding to the water a cyanamide compound such as an alkali metal or alkaline earth metal salt of cyanamide, and sufficient acid to neutralize the cyanamide salt to cyanamide while simultaneously providing a sufficient excess of hydrohalogen acid to establish the required reaction conditions in the solution. Among such salts may be mentioned the sodium, potassium or calcium salts such as $CaNCN$, $Ca(HNCN)_2$, $NaHNCN$ or $Na_2NCN$.

Once the polyhydroxylic polymer is contacted with the solution, the reaction mixture is heated to a temperature of 40° C. to 100° C. Below 40° C., the guanylation reaction is extremely slow while the hydrolysis of cyanamide proceeds at an appreciable rate. Above 100° C., there exists the possibility of damaging the substrate. The rate of guanylation improves as temperature is increased within the above range. Preferred temperatures are 50° C.–80° C.

For purposes of subsequent discussion in regard to desirable techniques for carrying out the process of this invention, it is desirable to categorize polyhydroxylic polymers as either water dispersible or non-water dispersible polymers.

The term "water dispersible polyhydroxylic polymer" means a polyhydroxylic polymer which is either soluble or colloidally dispersible in water. Examples are polyvinyl alcohol (soluble water) and corn starch (colloidally dispersible in water).

The term "non-water dispersible polyhydroxylic polymer" means a polyhydroxylic polymer which is not soluble or colloidally dispersible in water, although it may swell to varying degrees when placed in water. Examples are paper, cotton, cellophane, and rayon.

(3) Water dispersible polyhydroxylic polymers

Water-dispersible polyhydroxylic polymers are conveniently guanylated in accordance with this invention by dispersing or dissolving them in aqueous hydrohalogen acid cyanamide solutions such as those described above, and heating the reaction mixture to achieve guanylation. Under such treatment, reaction conditions are defined by the cyanamide to acid mole ratio, the cyanamide concentration of the solution, and the amount of solvent present in the solution.

The guanylated product is then recovered from the reaction mixture by precipitation or other known techniques, washed to remove reaction by-products and unreacted reactants after which it is dried.

(4) Non-water dispersible polyhydroxylic polymers

Non-water dispersible polyhydroxylic polymers can be guanylated in accordance with this invention in a more convenient manner. The substrate can be contacted with an aqueous hydrohalogen acid cyanamide solution prepared as discussed above except that the cyanamide concentration can be less than 0.4 molal.

The substrate is contacted with the solution for a period of time sufficient to impregnate it with solution. Ordinarily a wet pick up of anywhere from 100% to 250% of the dry weight of the substrate is desirable. The impregnated substrate is then heated at 40° C. to 100° C. to achieve guanylation. Guanylation in accordance with the process of this invention proceeds while hydrous conditions exist in the impregnated substrate which give rise to a pH of below 1, and prior to the establishment of anhydrous conditions which could result from continued heating. It must be noted in this connection that once the substrate has been impregnated or otherwise adequately contacted with the acidic aqueous cyanamide solution, it is permissible for the solvent content to fall below 30% in the impregnated solution as the impregnated substrate is heated, provided that some water remains to insure the existence of the hydrous conditions within the substrate which assure rapid guanylation. It is only essential that the solution not contain less than 30% solvent at the time of the initial contact of the solution and substrate in order to facilitate intimate and suitable contact between the solution and substrate at this time of initial contact as heretofore discussed. It should also be noted that if the impregnating solution has a cyanamide concentration less than 0.4 molal, it will be necessary to remove a sufficient amount of solvent from the impregnating solution which is in contact with the substrate in order to establish therein the required cyanamide concentration of 0.4 molal or higher. This can be readily accomplished by a variety of techniques. For example, the impregnated substrate can be heated, placed under vacuum, subjected to a forced draft air stream, or such.

The heating may occur with the impregnated substrate still in contact with the solution (for example, still immersed in the impregnating solution) or, as is highly preferred, the impregnated substrate can be removed from the bath prior to heating. The latter technique is preferred in order that the residual bath may be used for the impregnation of additional substrate. It is also preferred since it provides a convenient and economical process for guanylating a non-water dispersible substrate. For example, a continuous film, filament, or polyfilament could be drawn through the aqueous acidic cyanamide bath, then withdrawn from the bath and passed through a heating tunnel to affect guanylation of the substrate. Since the heating step is divorced from the impregnation step and from the bulk of the impregnating solution, cyanamide in the bath is not destroyed by hydrolysis. Since high guanylation yields based on the amount of impregnated cyanamide are achievable in accordance with the process of this invention, little cyanamide is wasted thereby yielding an attractive economic process. Such a technique is particularly suitable for treating materials such as rayon and cellophane. Makeup solution can be continuously fed into the impregnating bath to replenish that lost by impregnation within the substrate.

The following examples are provided to further illustrate the invention.

COMPARATIVE EXAMPLE 1

Guanylation of corn starch under prior art conditions (at pH 7.0)

This example is a substantial duplicate of Example 2C of U.S. Patent 3,051,691 in which the patentees report 0.667% nitrogen.

36 grams of granular corn starch (available under the name Stayco M and believed to be equivalent to the starch used in U.S. Patent 3,051,691) were slurried in 500 ml. of deionized water in a one liter three-necked, round-bottomed flask equipped with thermometer and stirrer. The flask contents were heated to 80° C. for 5 minutes to homogenize the slurry and then cooled to room temperature. 13.38 grams of a 56.5% aqueous cyanamide solution was then added to the solution and the solution pH adjusted to 7.0. Canamide concentration in the solution was about 0.3 molal. The solution was then held at pH 7.0 for 4 hours at 78° F. A 100 ml. aliquot of reaction solution was poured into 300 ml. of glacial acetic acid to precipitate the starch. The starch was washed 3 times in 150 ml. of 75% aqueous acetic acid.

The starch was then dried at least 3 hours at 50° C. in vacuo. Infra-red spectra were obtained on the starch in order to vertify the presence of a chemically bound pseudourea acid salt structure in the starch. Infra-red spectra were obtained with a Perkin Elmer Model 521 recording spectrophotometer in accordance with the following procedure:

Samples were run as KBr discs. Analysis of various pure O-alkyl pseudourea acid salt samples such methyl pseudourea, ethyl pseudourea, and isopropyl pseudourea had indicated that strong absorbance peaks representing a pseudourea acid salt grouping occur at wave lengths of about 1690 cm.$^{-1}$ and 1530 cm.$^{-1}$. The various substrates also exhibit characteristic absorbance peaks at certain wave-lengths. For example, cellulose has a peak at 895 cm.$^{-1}$. Quantitative values, expressed as percent hydroxyl groups reacted, are obtained by dividing a corrected absorbance of pseudourea acid salt grouping by a corrected absorbance of substrate and then multiplying the quotient by an experimentally determined correction factor to make infra-red analysis comparable to the known composition of the product as determined by other more quantitative analytical means on a variety of samples. For example, in the case of guanylated cellulose, corrected absorbance of the pseudourea acid salt grouping is taken at 1690 cm.$^{-1}$ using a tangent line type background correction; corrected absorbance of the cellulose substrate is taken by measuring absorbance at 890 cm.$^{-1}$ and subtracting therefrom the absorbance at 840 cm.$^{-1}$. The ratio of corrected pseudourea acid salt absorbance to corrected cellulose absorbance is then multiplied by a factor of 2.15 to produce a quantitative result expressed as percent hydroxy groups reacted. The factor 2.15 was arrived at by a comparison of infra-red results with nitrogen analyses on a number of guanylated cellulose samples.

The technique as described above for guanylated cellulose is suitable for use with other substrates such as starch and polyvinyl alcohol. Of course, as the amount of infra-red absorbance varies from sample to sample, slight changes in the wave-lengths at which the pseudourea acid salt peak appears may occur; for example, this peak occurs at 1682 cm.$^{-1}$ in polyvinyl alcohol (high absorbance) as compared to 1690 cm.$^{-1}$ in cellulose (relatively low absorbance). Also the characteristic absorbance peak of the substrate used in the above calculation will occur at varying wave-lengths.

Infra-red analyses serve two useful functions. First, they establish conclusively that the analytically found nitrogen is chemically bound to the substrate in a pseudourea structure and not just merely "present" in the substrate. Secondly, they provide for reaffirmation of the Kjeldahl nitrogen analyses on a series of samples since pseudourea absorbance should be proportional to the nitrogen analysis values.

Nitrogen analyses were obtained by the Kjeldahl method and showed <0.01% nitrogen in all of the starch samples. The infra-red spectra were devoid of pseudourea salt bands at 1690 cm.$^{-1}$. These results indicate essentially no guanylation of the starch under duplicated conditions of the prior art wherein the prior art had reported 0.667% nitrogen.

The identical experiment was carried out at gradually increasing temperatures in an effort to achieve some guanylation of the substrate. Temperatures as high as 80° C. were tried. However, infra-red analysis indicated the samples thus treated to be devoid of any pseudourea salt structure. Nitrogen analyses, as shown below in Table I, also indicate virtually no guanylation whatsoever.

TABLE I

| | Reaction Time (min.) | Percent Nitrogen |
|---|---|---|
| Temperature (° C.): | | |
| 25 | 240 | [1] 0.01 |
| 46 | 40 | 0.01 |
| 61 | 30 | 0.01 |
| 80 | 20 | 0.01 |
| Blank | | 0.02 |

[1] Repeat of the initial experiment.

COMPARATIVE EXAMPLE 2

Guanylation of corn starch under prior art conditions (at pH 1.1)

The same procedure was followed as in Comparative Example 1 except that the pH of the reaction mixture was adjusted to a pH of 1.1 using aqueous hydrochloric acid. Again a variety of reaction temperatures was employed. The following conditions prevailed in the reaction solution:

Moles cyanamide/moles HCl: 1.0
pH: 1.1
Cyanamide concentration: 0.3 molal

| Compound: | Weight percent |
|---|---|
| Water | 97.66 |
| Cyanamide | 1.26 |
| HCl | 1.08 |

In all cases, infra-red spectra indicated essentially no chemically bound pseudourea acid salt grouping in the treated starch. Nitrogen analyses as shown below in Table II indicate substantially no nitrogen substitution in the starch at all reaction temperatures studied.

TABLE II

| | Reaction Time (min.) | Percent Nitrogen |
|---|---|---|
| Temperature (° C.): | | |
| 25 | 240 | 0.03 |
| 46 | 40 | 0.01 |
| 65 | 30 | 0.02 |
| Blank | | 0 |

The data presented in Comparative Examples 1 and 2 clearly indicate that duplication of prior art conditions in two different ranges of pH fails to produce the high degrees of nitrogen substitution which are presetned for these conditions in U.S. Patent 3,051,691 and, in fact, indicates that little if any nitrogen substitution occurs, at least under the particular non-alkaline conditions studied.

COMPARATIVE EXAMPLE 3

The unexpected effect of pH below 1.0 upon the guanylation of corn starch

The data of Comparative Examples 1 and 2 indicate that virtually no nitrogen substitution occurs in starch at pH 7.0 or 1.1 when the cyanamide concentration in the reaction solution is relatively weak, i.e. about 0.3 molal. However, appreciable nitrogen substitution is obtainable under certain alkaline conditions of the prior art when higher cyanamide concentrations are employed. In order to better illustrate the dramatic effect of guanylating polyhydroxylic polymers under the highly acidic conditions of this invention, (i.e. a pH below 1.0) it is desirable to draw a comparison with the prior art conditions, i.e. pH of 1 to 14, employing conditions under which the prior art achieves appreciable nitrogen substitution. It was found as anticipated that more concentrated solutions of cyanamide, such as for example, a 0.9 molal solution, would result in appreciable nitrogen substitution employing the alkaline conditions. However, no acidic guanylation conditions in accordance with the prior art teaching, i.e. pH of 1 to 7, could be established which yield any appreciable guanylation. Comparative data were gathered using 0.9 molal cyanamide solutions at varying pH's. The reactions were carried out substantially in accordance with the procedure of Example 1 except that sufficient cyanamide was provided to establish the desired cyanamide concentration in the reaction solution. The solution pH was adjusted to its desired acidic or alkaline value with either HCl or NaOH and heated for 15 minutes at 75° C. A series of such reactions was carried out over a broad range of pH's. Starch samples were submitted for infra-red and nitrogen analyses as described in Example 1. Analytical results are tabulated below in Table III. The effect of reaction pH upon the degree of nitrogen substitution (as measured by Kjeldahl analysis) is shown graphically in FIGURE 1. It should be noted that the infra-red spectra not only confirm the nitrogen analyses data of FIGURE 1, but that the existence of such spectra is a clear indication that the pseudourea structure is chemically bound to the starch. Thus the infra-red spectrum is a more persuasive indication of the presence of bound pseudourea groupings in the starch than the Kjeldahl nitrogen analysis which will detect bound as well as unbound nitrogen in the starch. Such unbound nitrogen could conceivably exist in the starch if unreacted cyanamide was not thoroughly rinsed from the starch.

Referring to FIGURE 1, the data clearly show the remarkable and unexpected effect upon the degree of guanylation which is achieved at pH values below 1. FIGURE 1 also indicates that appreciable nitrogen substitution occurs at alkaline pH's but that between pH's of 1 to 7 the amount of guanylation occurring is not only quite minimal but it also remains fairly constant. Such an observation is in accord with the teaching of U.S. 3,051,691 which clearly indicates a higher degree of guanylation under alkaline conditions with a gradual tapering off in the degree of guanylation as the pH is lowered and approaches 1.0. The startling rise in nitrogen substitution which occurs as pH is lowered below 1.0, as dramatically shown in FIGURE 1, is highly unexpected and represents a distinct contribution to the art by applicants.

TABLE III

| | Moles cyanamide/mole HCl | Moles cyanamide/mole NaOH | Based on Kjeldahl analysis | | |
|---|---|---|---|---|---|
| | | | Percent nitrogen | Percent OH groups reacted | Percent yield [1] |
| Reaction pH: | | | | | |
| 11.2 | | 1.0 | .45 | .88 | 1.02 |
| 6.96 | | | .06 | .12 | .14 |
| 2.4 | 36 | | .05 | .10 | .12 |
| 0.5 | 1.0 | | .25 | .49 | .57 |
| 0.2 | 0.5 | | .45 | .88 | 1.02 |
| Blank | | | <0.01 | | |

[1] Based on cyanamide charged.

Applicants have not only provided a process for guanylating polyhydroxylic polymers, but have additionally discovered that by using such conditions, it becomes possible to produce guanylated products containing substantially greater amounts of nitrogen than have been previously available using the preferred alkaline conditions of the prior art. This enhanced degree of nitrogen substitution will be exemplified by the following two comparative examples.

COMPARATIVE EXAMPLE 4

Alkaline vs. highly acidic guanylation of polyvinyl alcohol 21.6 grams of polyvinyl alcohol (Vinol® 125, Air Reduction Co.), 67.0 grams (3.73 mole) of deionized water, and 10.5 grams of cyanamide (0.25 mole) were mixed together at room temperature in a 400 ml. beaker. During mixing, the temperature decreased to 17° C. The mixture was heated to between 40° C. and 50° C. to obtain a more easily-stirrable mixture. 28.8 grams of cyanamide dihydrochloride (0.25 mole cyanamide, 0.5 mole HCl) were then added in about 1 gram portions while keeping the temperature between 45° C. and 50° C. by heating with a steam bath. It was necessary to heat during these additions because of the negative heat of solution of cyanamide dihydrochloride. The viscosity decreased slightly during this time. After all the cyanamide dihydrochloride had been added, the reaction solution had the following characteristics:

Moles cyanamide/moles HCl: 1.0
Cyanamide concentration: 4.7 molal
pH: <1.0

| Compound | Grams | Wt. percent |
|---|---|---|
| Cyanamide | 21.2 | 20 |
| Hydrochloric acid | 18.0 | 17 |
| Water | 67.0 | 63 |
| Total | 106.2 | |

The mixture was heated to 75° C. in 5° C. increments. After each 5° C. temperature rise, the beaker was removed from the steam bath to see if any reaction was taking place. At 75° C. an exothermic reaction started and the temperature rose to 85° C. even though the beaker was placed in a bath of ice water. The reaction mixture bubbled but did not foam. After the exothermic reaction was over, there was no further exotherm on reheating to 77° C. on the steam bath.

After cooling to room temperature, the reaction mixture was dissolved in 100 ml. deionized water. Then the polymer was precipitated by pouring into acetone. The solvent was decanted, the lumps of polymer were washed with ethyl alcohol in a Waring Blendor and filtered. The filter cake was washed once with absolute alcohol and finally with acetone. The polymer was dried overnight in a vacuum oven at 60° C. and on analysis was found to contain 4.42% nitrogen based on the weight of the dry treated product.

Following substantially the same procedure as that outlined immediately above, additional experiments were performed using polyvinyl alcohol and varying reaction conditions. Results of these experiments are shown in Table IV below.

TABLE IV (THIS INVENTION)

| Polyvinyl alcohol,[2] gram | Reactants | | | | | | | | | Conditions | | | | |
|---|---|---|---|---|---|---|---|---|---|---|---|---|---|---|
| | Cyanamide | | | Hydrochloric acid | | | Water | | | Moles cyanamide/mole HCl | Cyanamide molality | pH of Reaction mixture | Temp. (° C.) | Heating time (hr.) | Percent nitrogen (dry basis) |
| | Gram | Mole | Percent in solution | Gram | Mole | Percent in solution[1] | Gram | Mole | Percent in solution | | | | | | |
| 36 | 35 | .83 | 28.4 | 33 | .92 | 26.8 | 55.4 | 3.07 | 44.8 | 0.9 | 6.72 | <1.0 | 20 | 15 | 5.1 |
| 216 | 210 | 5 | 28.3 | 198 | 5.5 | 26.7 | 333 | 18.5 | 45.0 | 0.91 | 6.75 | <1.0 | 22-30 | 64 | [3] 5.4 |

Figure 3A:
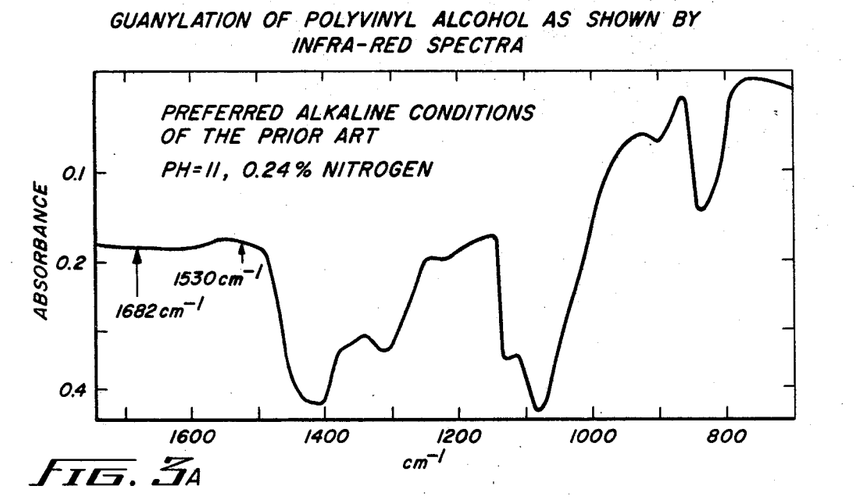
FIGURES 3a and 3b represent an infra-red spectra comparison of polyvinyl alcohol guanylated under the preferred alkaline conditions of the prior art and the highly acidic conditions of this invention, and is provided to conclusively establish the enhanced degree of guanylation achieved using the extremely acidic conditions of this invention.
Figure 3B:
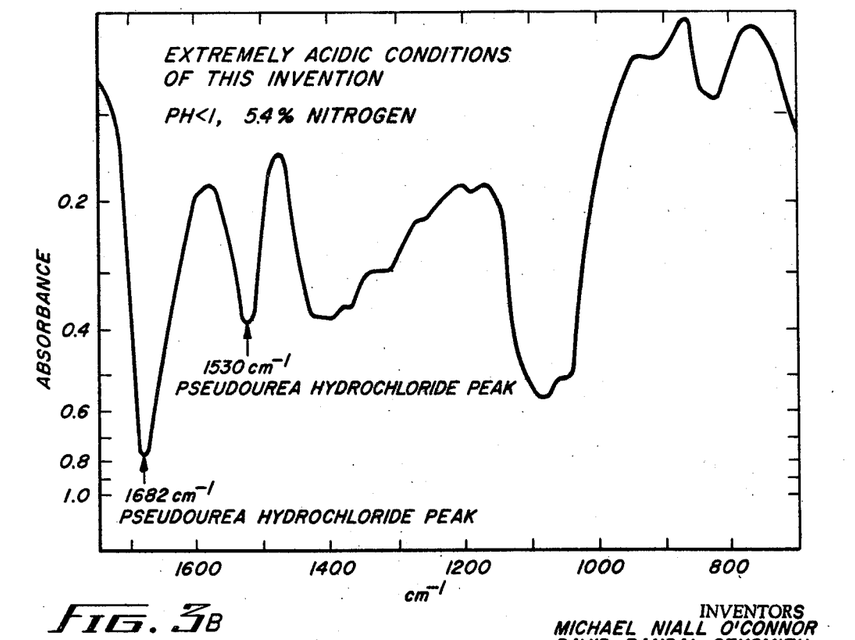

[1] Excluding the polyvinyl alcohol.
[2] Elvanol ®72-60, E.I. du Pont de Nemours and Co.
[3] Infra-red spectrum of guanylated product shown in Figure 3b.

A number of attempts were made to guanylate polyvinyl alcohol under various preferred alkaline conditions of the prior art as represented by U.S. Patent 3,051,691. Results are shown below in Table V.

TABLE V (PRIOR ART)

| Polyvinyl alcohol, gram | Reactants | | | | | | | | | Conditions | | | | |
|---|---|---|---|---|---|---|---|---|---|---|---|---|---|---|
| | Cyanamide | | | Sodium Hydroxide | | | Water | | | Cyanamide molality | pH of Reaction mixture | Temp. (° C.) | Heating time (hr.) | Percent nitrogen (dry basis) |
| | Gram | Mole | Percent in solution[3] | Gram | Mole | Percent in solution[3] | Gram | Mole | Percent in solution[3] | | | | | |
| 36[1] | 3.45 | .082 | .74 | 4.9 | .122 | 1.05 | 458 | 25.5 | 98.2 | .178 | Alkaline | 20 | 1 | 0.3 |
| 36[2] | 6.6 | .157 | 1.25 | 6.6 | .165 | 1.25 | 513 | 28.5 | 97.5 | .30 | 11 | 36 | 2.5 | [4] 0.2 |
| 36[2] | 13.1 | .312 | 2.7 | 7.0 | .175 | 1.45 | 463 | 25.7 | 95.85 | .65 | Alkaline | 35-50 | 2.5 | .8 |
| 36[2] | 25.2 | .60 | 5.4 | 36 | .90 | 7.6 | 411 | 22.8 | 87 | 1.27 | do | 47-68 | 3.0 | .7 |

[1] Elvano® 52-22, E.I. du Pont de Nemours and Co.
[2] Elvanol® 72-60, E.I. du Pont de Nemours and Co.
[3] Excluding the polyvinyl alcohol.
[4] Infra-red spectrum of guanylated product shown in Figure 3a.

The infra-red spectra of polyvinyl alcohol guanylated in accord with the preferred alkaline conditions of the prior art and polyvinyl alcohol guanylated in accord with this invention are presented in FIGURES 3a and 3b respectively. Comparison of FIGURES 3a and 3b indicates the appearance of two sharp absorption peaks at 1682 cm.$^{-1}$ and 1530 cm.$^{-1}$ in the spectrum of the sample guanylated in accord with this invention but essentially no such peaks in that of the sample guanylated under alkaline process conditions. Since the appearance of peaks at these wave-lengths is indicative of the pseudourea acid salt grouping, it is apparent that the sample of FIGURE 3b had been guanylated to a far greater extent than that of FIGURE 3a. This is confirmed by a Kjeldahl nitrogen analysis of 5.4% for the sample of FIGURE 3b and 0.24% for the sample of FIGURE 3a. Similar infra-red spectra were observed with the other guanylated samples is only 0.3 molal, this concentration is raised above 0.4 molal in the solution which is impregnated within the cellulose when the impregnated cellulose is pre-heated under mild temperatures prior to the higher temperature curing step. The pre-heating step removes a sufficient amount of water to raise the cyanamide concentration from 0.3 molal to above 0.4 molal.

Results are shown in Table VI.

TABLE VI

| Impregnating solution | | | Pre-cure conditions | | Curing conditions | | Based on Kjeldahl analysis | | |
|---|---|---|---|---|---|---|---|---|---|
| Moles cyanamide/ mole HCl | pH | Reaction pH | Percent wet pick-up | Time (hr.) | Temp. (° C.) | Time (hr.) | Temp. (° C.) | Percent nitrogen | Percent OH Groups reacted [1] | Percent yield [2] |
| | 11 | Alkaline | 194 | 3 | 20 | 15.5 | 78–82 | 3.114 | 3.22 | 3 7 |
| | 7 | 7 | 199 | 3 | 20 | 15.5 | 78–82 | .156 | .30 | 9 |
| 425 | 2.94 | Acidic | 179 | 3 | 20 | 15.5 | 78–82 | .123 | .23 | 8 |
| 21 | 1.97 | Acidic | 182 | 3 | 20 | 15.5 | 78–82 | 2.42 | .47 | 6 |
| 6 1 | 5 1.1 | <1.0 | 198 | 3 | 20 | 15.5 | 78–82 | .73 | 1.40 | 44 |
| 6 0.5 | .9 | <1.0 | 184 | 3 | 20 | 15.5 | 78–82 | .80 | 1.57 | 53 |
| 6 1 | 5 1.1 | <1.0 | 178 | 3 | 40–50 | 1.2 | 73–79 | .59 | 1.16 | 45 |
| 6 1 | 5 1.1 | <1.0 | 224 | 3 | 40–50 | 1.2 | 73–79 | .65 | 1.37 | 42 |
| 6.5 | .9 | <1.0 | 176 | 3 | 40–50 | 1.2 | 73–79 | 4.80 | 4 1.57 | 4 62 |
| 6.5 | .9 | <1.0 | 202 | 3 | 40–50 | 1.2 | 73–79 | .74 | 1.45 | 50 |

[1] Calculated from nitrogen analysis.

[2] Percent yield = $\dfrac{\text{Nitrogen in product}}{\text{Nitrogen Available based on wet pick-up of substrate}} \times 100$.

[3] Infra-red spectrum of guanylated product shown in Figure 4a.
[4] Infra-red spectrum of guanylated product shown in Figure 4b.
[5] Reduced to a pH below 1.0 during the pre-heating step which removes sufficient water from the impregnating solution to raise the cyanamide concentration of said solution from 0.3 to 0.4 molal or higher.
[6] Process conditions of this invention.

of Tables IV and V, said spectra confirming the nitrogen analysis data presented in these tables.

Guanylated polyvinyl alcohol containing anywhere from about 2% to about 8% can be prepared by the process of this invention, said guanylated polyvinyl alcohols representing novel compositions.

It is apparent from a comparison of the data of Tables IV and V and from the infra-red spectra of the samples listed in these tables that the extremely acidic guanylating process of this invention produces guanylated polyvinyl alcohol having a remarkable amount of nitrogen substitution compared to products prepared under preferred alkaline process conditions of the prior art. For example, products prepared in accordance with the process of this invention contain from about 7 to 27 times more nitrogen than products prepared in accordance with the prior art process conditions. The second experiment in Table V (0.2% nitrogen) is a repeat of Example 16 of U.S. Patent 3,051,691 wherein patentees report 0.823% nitrogen.

COMPARATIVE EXAMPLE 5

Alkaline vs. highly acidic guanylation of cellulose

Aqueous 0.3 molal cyanamide solutions were prepared at various pH's, the pH being adjusted to the desired value by either HCl or NaOH. A total volume of 600 ml. of solution was used for each experiment. A 3.04 gm. piece of No. 1 Whatman filter paper was soaked in the room temperature solution for a sufficient time to obtain a 150 to 250% weight increase in the paper after light blotting of the surface. The solution impregnated paper was dried in vacuo at 20° C. for 3 hours and then cured in an oven at atmospheric pressure at about 73–82° C. for varying periods of time to achieve guanylation of the paper. The cured paper was washed in three changes of deionized water and then dried in vacuo at 50° C. for at least three hours. Samples treated under alkaline or mildly acidic conditions were washed with deionized water acidified with hydrochloric acid in order to neutralize the base and to convert any pseudourea groups to the pseudourea salt form.

Nitrogen contents of the dried treated paper were obtained by the Kjeldahl method; infra-red spectra were also obtained in accordance with the procedure given in Comparative Example 1. It must be noted that although the cyanamide concentration of the impregnating solution The infra-red spectra of cellulose guanylated in accord with the preferred alkaline conditions of the prior art and cellulose guanylated in accord with this invention are presented in FIGURES 4a and 4b, respectively.

Figure 4A:
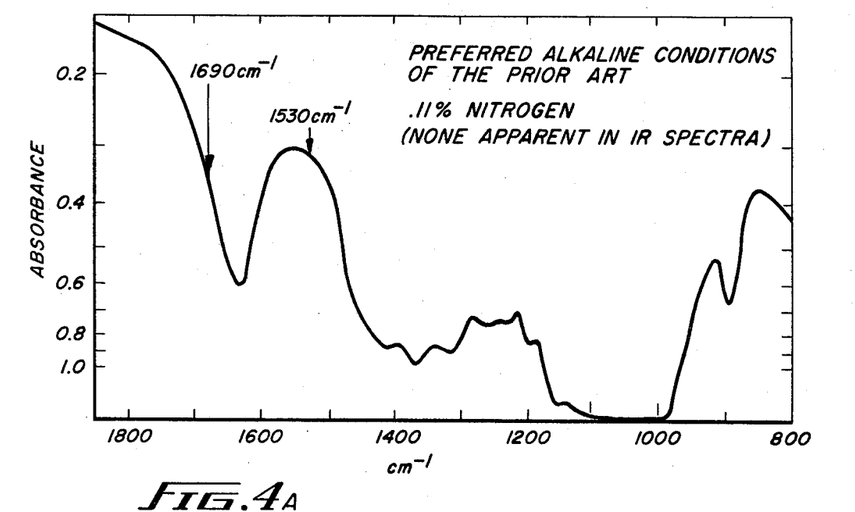
FIGURES 4a and 4b represent an infra-red spectra comparison of cellulose guanylated under the preferred alkaline conditions of the prior art and the highly acidic conditions of this invention, and is provided to further conclusively establish the enhanced degree of guanylation achieved using the extremely acidic conditions of this invention.
Figure 4B:
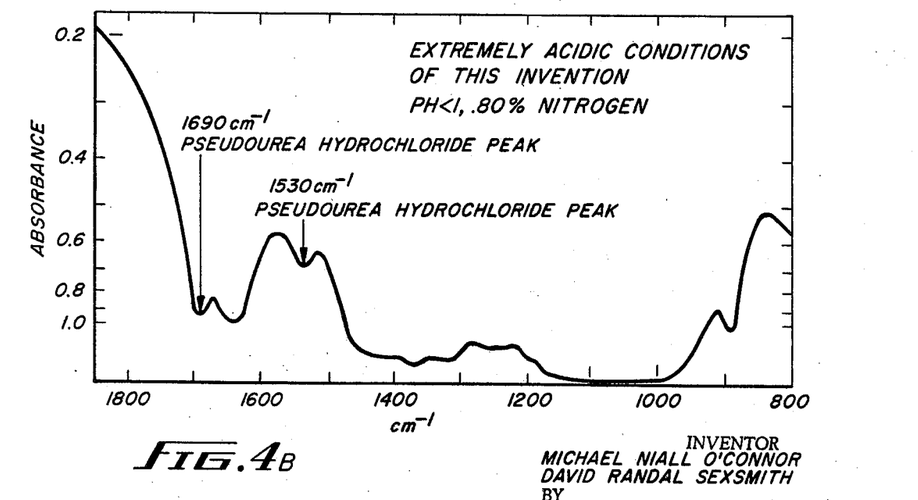

A comparison of the infra-red spectra of FIGURES 4a and 4b indicates that in the case of the sample guanylated under the conditions of this invention, two distinct absorbtion peaks which are indicative of a psuedourea acid salt grouping appear at wave-lengths of 1690 cm.$^{-1}$ and 1530 cm.$^{-1}$. No such peaks are discernible in the sample guanylated under the preferred alkaline conditions of the prior art thereby indicating that an enhanced degree of guanylation occurs when cellulose is guanylated in accord with the highly acidic conditions of this invention. Nitrogen anaylses confirm the infra-red spectra indicating 0.114% nitrogen for the sample of FIGURE 4a and 0.80% nitrogen for the sample of FIGURE 4b. Infra-red spectra were obtained on all the samples in Table VI and confirmed the nitrogen analyses shown therein.

The data of Table VI and the infra-red spectra clearly indicate the greatly enhanced degree of nitrogen substitution observed employing the highly acidic conditions of this invention as compared to other acidic conditions and the neutral and alkaline conditions of the prior art. The data indicate that the process of this invention will produce guanylated cellulose having about 7 times the nitrogen content of cellulose guanylated by various acidic, neutral, and alkaline conditions not falling within the process conditions of this invention.

The enhanced nitrogen substitution observed in cellulose which is guanylated under the acidic process conditions of this invention is in accord with that observed in the previous example wherein the polyhydroxylic polymer was polyvinyl alcohol. The data of comparative Examples 4 and 5 leave little doubt as to the substantially increased degree of guanylation achievable employing the process of this invention when compared to that achieved using the preferred conditions of the prior art.

EXAMPLE 6

Aqueous guanylation of cellophane at a pH below 1.0

An aqueous hydrochloric acid cyanamide solution was prepared by dissolving 76 gm. of HCl (2 moles) and 168 gm. of cyanamide (4 moles) in a liter of water. The aqueous solution had the following characteristics:

Moles cyanamide/moles HCl: 2
Cyanamide concentration: 3.22 molal
pH: <1

| Compound | Grams | Wt. percent |
|---|---|---|
| Cyanamide | 168 | 13.5 |
| Hydrochloric acid | 76 | 6.1 |
| Water | 1,000 | 80.4 |
| Total | 1,244 | |

A piece of dry cellophane film was immersed in the solution for 30 minutes to obtain a 109% weight increase after the film was removed from the solution and its surface dried by blotting. The impregnated film was dried at 58–60° C. for 45 minutes in a forced draft oven. The film was then thoroughly washed with water to remove by-products and unreacted materials and then dried. Infrared analysis indicated that 4% of the available hydroxyl groups had reacted corresponding to an 11% conversion of the impregnated cyanamide to bound psuedourea. The sample contained 1.2% nitrogen.

When the above experiment was repeated identically except that after heating for 45 minutes at 48–60° C., the impregnated cellophane was heated an additional 30 minutes at 80° C., infra-red analysis indicated that 11% of the available hydroxyl groups had reacted corresponding to a 30% conversion of impregnated cyanamide to bound psuedourea. The sample contained 2.5% nitrogen. When the sample was heated the additional 30 minutes at 100° C. instead of 80° C., infra-red analysis indicated that 13% of the available hydroxyl groups had reacted corresponding to a 36% conversion of impregnated cyanamide to bound pseudourea. The sample contained 3% nitrogen. Untreated cellophane is substantially free from nitrogen.

EXAMPLE 7

Aqueous guanylation of corn starch at a pH below 1.0

32.4 gm. of corn starch and 40.0 gm. of glacial acetic acid (inert diluent) were mixed with stirring and to the stirred mixture was added 25.2 gm. of cyanamide (0.6 mole) whereupon the temperature dropped to 3° C. 50 ml. (59.5 gm.) of 37% aqueous hydrochloric acid (.61 mole HCl) was then added slowly over 25 minutes. The temperature during acid addition rose to 50° C. At the end of the addition time, the exotherm continued reaching 80° C. The solution thus produced had the following characteristics:

Moles cyanamide/moles HCl: .99
pH: <1
Cyanamide concentration: 4.8 molal

| Compound | Grams | Wt. percent |
|---|---|---|
| Acetic acid | 40 | 62.2 |
| Water | 37.5 | |
| Cyanamide | 25.2 | 20.3 |
| HCl | 22 | 17.5 |
| Total | 124.7 | |

At the end of one hour there resulted a thin, clear, yellow solution which was allowed to stand overnight. The yellow solution darkened on standing to almost black and was then decolorized with charcoal. Treatment with 200 ml. isopropyl alcohol caused the precipitation of a white solid. The solid powder was washed with isopropyl alcohol, then with acetone, and dried to give 25 g. of a gray, water-soluble, gelatinized starch.

A 1% solution of the product had a viscosity of 0.7 cps. and a light transmission of 98%.

The dry product contained 3.8% nitrogen. Untreated starch contained .05% nitrogen.

EXAMPLE 8

Aqueous guanylation of lignin at a pH below 1.0

50 gm. of lignin and 65 gm. of glacial acetic acid (inert diluent) were mixed with stirring and to the stirred mixture was added 25 gm. of cyanamide (.6 mole). 58.8 ml. (69 gm.) of 37% aqueous hydrochloric acid (.71 mole HCl) was then added slowly. The temperature rose to 80° C. due to the exotherm. The solution thus produced had the following characteristics:

Moles cyanamide/moles HCl: .85
pH: <1
Cyanamide concentration: 3.8

| Compound | Grams | Wt. percent |
|---|---|---|
| Acetic acid | 65 | 68.2 |
| Water | 43.5 | |
| Cyanamide | 25 | 15.7 |
| HCl | 25.5 | 16.1 |
| Total | 159.0 | |

The reaction mixture was then held at 90° C. for 2 hrs. and allowed to cool. A reddish black, clear solution resulted. The reaction mixture was treated with petroleum ether to remove the acetic acid, and then extracted with isopropyl alcohol. The major portion of the product was insoluble in the alcohol. The product was insoluble in water, soluble in caustic and contained 1.9% nitrogen by analysis as compared to 0.05% nitrogen in the untreated lignin.

We claim:
1. An aqueous, strongly acidic process for guanylating polyhydroxylic polymers selected from the group consisting of polyvinyl alcohol, starch and starch derivatives, dextrins and pectins, polysaccharide gums, cellulose and derivatives thereof, hemicelluloses, and lignin, which comprises:
  (a) contacting said non-guanylated material with an aqueous hydrochloric acid or hydrobromic acid solution of a compound selected from the group consisting of cyanamide, alkali metal salts of cyanamide, and alkaline earth metal salts of cyanamide at a temperature of from about 40° C. to about 100° C. for a sufficient time to achieve guanylation of said polymer,
  (b) said solution having a mole ratio of cyanamide to said acid of from about 0.5 to about 4.0, a cyanamide concentration of at least about 0.4 molal, a solvent content not less than about 30% by weight, and a pH less than about 0.5.

2. The process of claim 1, wherein the mole ratio of cyanamide to acid is about 0.5 to about 2.0, the cyanamide concentration is from about 0.9 to about 8 molal, and the solvent content is not less than about 40% by weight.

3. The process of claim 2, wherein the cyanamide concentration is from about 2 to about 4 molal.

4. The process of claim 1, wherein said polyhydroxylic polymers are non-water dispersible polymers selected from the group consisting of granular starch, wood pulp, paper, alpha-cellulose, cellophane and rayon, and wherein the acid is hydrochloric acid.

5. The process of claim 1 wherein said polyhydroxylic polymer is polyvinyl alcohol.

6. The process of claim 1 wherein the pH is between about 0.2 and about 0.5.

7. The guanylated products prepared by the process of claim 1.

8. Guanylated polyvinyl alcohol having a nitrogen content of from about 2% to about 8% by weight.

9. An aqueous, strongly acidic process for guanylating a non-dispersible polyhydroxylic polymer selected from the group consisting of starch and starch derivatives, dextrins and pectins, polysaccharide gums, cellulose and derivatives thereof, hemicelluloses, and lignin which comprises:
  (a) contacting said polymer with an aqueous hydrochloric acid or hydrobromic acid solution of a compound selected from the group consisting of cyanamide, and alkaline earth metal salts of cyanamide, and alkaline earth metal salts of cyanamide, said solution having a mole ratio of cyanamide to said acid of from about 0.5 to about 4.0 and a solvent content not less than 30% by weight, for a time sufficient to impregnate said polymer with solution;

(b) separating said impregnated polymer from contact with said solution; and then (c) heating the solution impregnated polymer at a temperature of from about 40° C. to about 100° C. said impregnated solution having a cyanamide concentration of at least about 0.4 molal and a pH less than about 0.5 at some stage during the heating step.

10. The process of claim 9 wherein said polymer is cellulose or a derivative thereof.

References Cited

UNITED STATES PATENTS

| | | | |
|---|---|---|---|
| 2,530,261 | 11/1950 | Morton et al. | 8—116.2 |
| 2,907,625 | 10/1959 | Bikales et al. | 8—116.2 |
| 3,051,691 | 8/1962 | Elizer et al. | 260—233.3 |
| 3,347,832 | 10/1967 | Mills | 8—116.2 |

DONALD E. CZAJA, Primary Examiner

R. W. GRIFFIN, Assistant Examiner

U.S. Cl. X.R.

8—115.5, 116.2, 129; 117—144, 155; 260—209, 209.5, 209.6, 212, 220, 231, 233.3